United States Patent Office 3,167,553
Patented Jan. 26, 1965

3,167,553
2-AMINO-4-ETHEREAL-5-METHYL-6-
PHENYLPYRIMIDINES
Hans A. Wagner, Skokie, Ill., assignor to G. D. Searle & Co., Chicago, Ill., a corporation of Delaware
No Drawing. Filed May 8, 1963, Ser. No. 279,024
7 Claims. (Cl. 260—256.4)

This invention relates to 2-amino-4-ethereal-5-methyl-6-phenylpyrimidines and a process for the manufacture thereof. More particularly, this invention provides new and useful chemical compounds of the formula

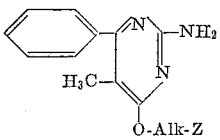

wherein Alk represents an alkylene radical and Z represents a hydroxy, optionally-alkylated amino, or phenoxy radical.

Among the alkylene radicals represented by Alk, especially lower alkylene radicals are preferred, for example, methylene, ethylene, trimethylene, propylene, tetramethylene, 2-methyl-1,2-propylene, pentamethylene, 2,2-dimethyl-1,3-propylene, and like bivalent, saturated, acyclic, straight- or branched-chain, hydrocarbon groupings have the formula $$-C_nH_{2n}-$$

wherein $n$ represents a positive integer less than 8.

Amino radicals within the purview of Z include both the primary amino radical, $-NH_2$, and secondary and most advantageously tertiary amino radicals resulting from the substitution of 1 or 2 alkyl radicals, respectively, for hydrogen therein—especially lower alkyl radicals, such as methyl, ethyl, propyl, isopropyl, butyl, isobutyl, sec-butyl, pentyl, neopentyl, hexyl, isohexyl, heptyl, and like monovalent, saturated, acyclic, straight- or branched-chain, hydrocarbon groupings having the formula $$-C_nH_{2n+1}$$

wherein $n$ represents, as before, a positive integer less than 8.

Equivalent to the foregoing basic amines for the purposes of this invention are corresponding acid addition salts of the formula

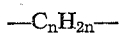
·HX wherein Alk and Z have the meanings previously assigned and X represents 1 equivalent of an anion—for example, chloride, bromide, iodide, nitrate, phosphate, sulfate, sulfamate, methyl sulfate, ethyl sulfate, benzenesulfonate, toluenesulfonate, acetate, lactate, succinate, malate, maleate, tartrate, citrate, gluconate, ascorbate, benzoate, cinnamate, or the like—which, in combination with the cationic portion of the salt aforesaid, is neither pharmacologically nor otherwise undesirable in pharmaceutical dosage.

The compounds to which this invention relates are useful by reason of their valuable pharmacological properties. Thus, for example, they are antibiotics variously effective against bacteria such as *Diplococcus pneumoniae*, fungi such as *Trichophyton mentagrophytes*, algae such as *Chlorella vulgaris*, and cotyledenous seed germination. They also reduce the edematous swelling characteristic of the inflammatory response to tissue insult, inhibit hypercholesterolemia, and manifest substantial antihypertensive activity.

Manufacture of the subject bases proceeds by heating 2-amino-4-chloro-5-methyl-6-phenylpyrimidine with a solution of sodium metal in an alcohol of the formula

Alk and Z being defined as before. Conversion of the resultant bases to acid addition salts is accomplished by simple admixture of these compounds with 1 equivalent of any of various inorganic and strong organic acids, the anionic portion of which conforms to X as hereinabove defined.

The following examples describe in detail compounds illustrative of the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted.

EXAMPLE 1

2 - amino - 4 - (2 - hydroxyethoxy) - 5 - methyl - 6-phenyl-pyrimidine.—To a solution of 23 parts of sodium in 1500 parts of 1,2-dihydroxyethane is added 219 parts of 2-amino-4-chloro-5-methyl-6-phenylpyrimidine. The resultant mixture is heated at 125° for 3 hours, then poured into 20,000 parts of water. The solid thrown down is filtered off, washed with water until the washings are neutral, dried in air, and recrystallized from methanol. The product thus isolated is 2-amino-4-(2-hydroxyethoxy)-5-methyl-6-phenylpyrimidine which, washed with ether, melts at approximately 143°. The product has the formula

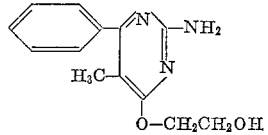

EXAMPLE 2

2 - amino - 4 - (3 - hydroxypropoxy) - 5 - methyl - 6-phenyl-pyrimidine.—Substitution of 1500 parts of 1,3-dihydroxypropane for the 1,2-dihydroxyethane called for in Example 1 affords, by the procedure there detailed, 2-amino - 4 - (3 - hydroxypropoxy) - 5 - methyl - 6 - phenylpyrimidine melting at approximately 140–141°. The product has the formula

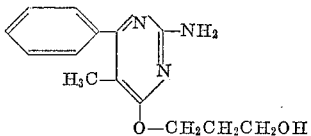

EXAMPLE 3

2 - amino - 4 - (2 - aminoethoxy) - 5 - methyl - 6 - phenyl-pyrimidine.—Substitution of 1500 parts of 2-aminoethanol for the 1,2-dihydroxyethane called for in Example 1 affords, by the procedure there detailed, 2-amino-4-(2-aminoethoxy)-5-methyl-6-phenylpyrimidine melting at approximately 172–173°. The product has the formula

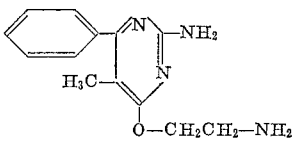

EXAMPLE 4

*2 - amino - 4 - (2 - dimethylaminoethoxy) - 5 - methyl-6-phenylpyrimidine.*—Substitution of 1500 parts of 2-dimethylaminoethanol for the 1,2-dihydroxyethane called for in Example 1 affords, by the procedure there detailed, 2 - amino - 4 - (2 - dimethylaminoethoxy) - 5 - methyl-6-phenylpyrimidine melting at approximately 75–76°. The product has the formula

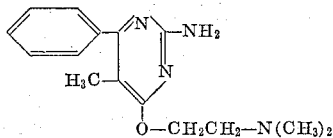

EXAMPLE 5

*2 - amino - 4 - (3 - diethylaminopropoxy) - 5 - methyl-6-phenylpyrimidine.*—Substitution of 1500 parts of 3-diethylaminopropanol for the 1,2-dihydroxyethane called for in Example 1 affords, by the procedure there detailed, 2 - amino - 4 - (3 - diethylaminopropoxy) - 5 - methyl - 6-phenylpyrimidine having the formula

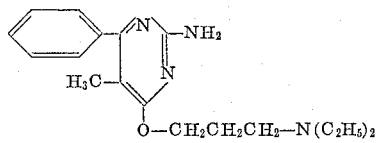

EXAMPLE 6

*2 - amino - 5 - methyl - 6 - phenyl - 4 - (2 - phenoxyethoxy)-pyrimidine.*—Substitution of 1500 parts of 2-phenoxy-ethanol for the 1,2-dihydroxyethane called for in Example 1 affords, by the procedure there detailed, 2-amino- 5 - methyl - 6 - phenyl - 4 - (2 - phenoxyethoxy)-pyrimidine melting at approximately 155–156° and having the formula

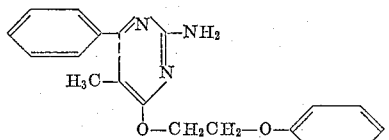

What is claimed is:
1. A compound of the formula

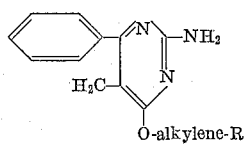

wherein the alkylene radical called for contains fewer than 3 carbon atoms and R designates a member of the group consisting of radicals of the formulas

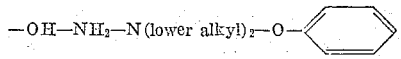

2. A compound of the formula

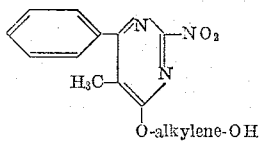

wherein the alkylene radical called for contains fewer than 3 carbon atoms.

3. 2 - amino - 4 - (2- hydroxyethoxy) - 5 - methyl - 6-phenylpyrimidine.

4. 2 - amino - 4 - (2 - aminoethoxy) - 5 - methyl - 6-phenylpyrimidine.

5. A compound of the formula

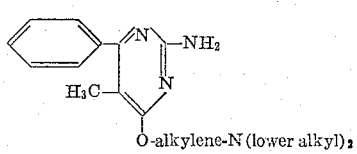

wherein the alkylene radical called for contains fewer than 3 carbon atoms.

6. 2 - amino - 4 - (2 - dimethylaminoethoxy) - 5-methyl-6-phenylpyrimidine.

7. 2 - amino - 5 - methyl - 6 - phenyl - 4 - (2 - phenoxyethoxy)pyrimidine.

References Cited in the file of this patent
UNITED STATES PATENTS 2,610,188    Oroshnik _____ Sept. 9, 1952
2,723,977    Rorig _____ Nov. 15, 1955

OTHER REFERENCES

Thompson: Jour. Chem. Soc. (London), pages 617–621 (1962).

UNITED STATES PATENT OFFICE
CERTIFICATE OF CORRECTION

Patent No. 3,167,553                  January 26, 1965

Hans A. Wagner

It is hereby certified that error appears in the above numbered patent requiring correction and that the said Letters Patent should read as corrected below.

Column 1, line 39, before "pentyl" insert -- tert-butyl, --; column 2, lines 29, 48, and lines 61 and 62, for "phenyl-pyrimidine", in italics, each occurrence, read -- phenylpyrimidine --, in italics; column 3, lines 45 to 50, the formula should appear as shown below instead of as in the patent:

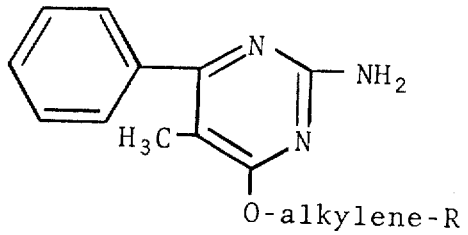

column 4, lines 10 to 15, the formula should appear as shown below instead of as in the patent:

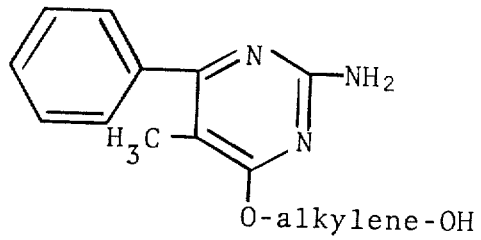

Signed and sealed this 22nd day of June 1965.

(SEAL)
Attest:

ERNEST W. SWIDER                  EDWARD J. BRENNER
Attesting Officer               Commissioner of Patents